United States Patent
Ward et al.

(10) Patent No.: US 10,676,681 B2
(45) Date of Patent: Jun. 9, 2020

(54) PROCESS AND INSTALLATION FOR THE CONVERSION OF CRUDE OIL TO PETROCHEMICALS HAVING AN IMPROVED CARBON-EFFICIENCY

(71) Applicants: SAUDI BASIC INDUSTRIES CORPORATION, Riyadh (SA); SABIC GLOBAL TECHNOLOGIES B.V., Bergen op Zoom (NL)

(72) Inventors: Andrew Mark Ward, Stockton-on-Tees (GB); Ravichander Narayanaswamy, Bangalore (IN); Arno Johannes Maria Oprins, Maastricht (NL); Vijayanand Rajagopalan, Bangalore (IN); Egidius Jacoba Maria Schaerlaeckens, Geleen (NL); Raul Velasco Pelaez, Maastricht (NL)

(73) Assignees: SAUDI BASIC INDUSTRIES CORPORATION, Riyadh (SA); SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 14/901,865

(22) PCT Filed: Jun. 30, 2014

(86) PCT No.: PCT/EP2014/063856
§ 371 (c)(1),
(2) Date: Dec. 29, 2015

(87) PCT Pub. No.: WO2015/000848
PCT Pub. Date: Jan. 8, 2015

(65) Prior Publication Data
US 2016/0369187 A1 Dec. 22, 2016

(30) Foreign Application Priority Data
Jul. 2, 2013 (EP) .................................... 13174759

(51) Int. Cl.
*C10G 69/02* (2006.01)
*C10G 65/10* (2006.01)
(Continued)

(52) U.S. Cl.
CPC ............. *C10G 69/02* (2013.01); *C10G 47/02* (2013.01); *C10G 47/14* (2013.01); *C10G 47/16* (2013.01);
(Continued)

(58) Field of Classification Search
CPC ............ C07C 5/32–3337; C10G 69/02; C10G 65/10; C10G 65/18; C10G 65/00;
(Continued)

(56) References Cited

U.S. PATENT DOCUMENTS

| 3,256,176 A | 6/1966 | Mills et al. |
| 3,433,848 A | 3/1969 | Devins et al. |

(Continued)

FOREIGN PATENT DOCUMENTS

| CN | 101208412 | 6/2008 |
| CN | 101268170 | 9/2008 |

(Continued)

OTHER PUBLICATIONS

Alfke et al. "Oil Refining", Ullmann's Encyclopedia of Industrial Chemistry, Published Online Jan. 15, 2007.*
(Continued)

*Primary Examiner* — Ali Z Fadhel
(74) *Attorney, Agent, or Firm* — Norton Rose Fulbright US LLP

(57) ABSTRACT

The present invention relates to an integrated process to convert crude oil into petrochemical products comprising crude oil distillation, hydrocracking and olefins synthesis, which process comprises subjecting a hydrocracker feed to
(Continued)

hydrocracking to produce LPG and BTX and subjecting the LPG produced in the process to olefins synthesis. Furthermore, the present invention relates to a process installation to convert crude oil into petrochemical products comprising: a crude distillation unit comprising an inlet for crude oil and at least one outlet for one or more of naphtha, kerosene and gasoil; a hydrocracker comprising an inlet for a hydrocracker feed, an outlet for LPG and an outlet for BTX; and a unit for olefins synthesis comprising an inlet for LPG produced by the integrated petrochemical process installation and an outlet for olefins. The hydrocracker feed used in the process and the process installation of the present invention comprises one or more of naphtha, kerosene and gasoil produced by crude oil distillation in the process; and refinery unit-derived light-distillate and/or refinery unit-derived middle-distillate produced in the process. The process and process installation of the present invention have an increased production of petrochemicals at the expense of the production of fuels and an improved carbon efficiency in terms of the conversion of crude oils into petrochemicals.

15 Claims, 3 Drawing Sheets

(51) Int. Cl.
| | |
|---|---|
| C10G 47/14 | (2006.01) |
| C10G 47/16 | (2006.01) |
| C10G 65/18 | (2006.01) |
| C10G 47/02 | (2006.01) |
| C10G 65/00 | (2006.01) |
| C10G 47/20 | (2006.01) |

(52) U.S. Cl.
CPC ............. *C10G 47/20* (2013.01); *C10G 65/00* (2013.01); *C10G 65/10* (2013.01); *C10G 65/18* (2013.01); *B01J 2219/00002* (2013.01); *B01J 2219/0004* (2013.01); *B01J 2219/00006* (2013.01); *B01J 2219/00027* (2013.01); *B01J 2219/00033* (2013.01); *B01J 2219/0038* (2013.01); *B01J 2219/00042* (2013.01); *C10G 2300/104* (2013.01); *C10G 2300/1044* (2013.01); *C10G 2300/1051* (2013.01); *C10G 2300/1055* (2013.01); *C10G 2300/1059* (2013.01); *C10G 2400/20* (2013.01); *C10G 2400/30* (2013.01); *Y02P 20/125* (2015.11)

(58) Field of Classification Search
CPC ........ C10G 47/02; C10G 47/14; C10G 47/16; C10G 47/20; C10G 2300/104; C10G 2300/1044; C10G 2300/1051; C10G 2300/1055; C10G 2300/1059; C10G 2400/20; C10G 2400/30; Y02P 20/125; B01J 2219/0038; B01J 2219/00033; B01J 2219/00042; B01J 2219/0004; B01J 2219/00027; B01J 2219/00002; B01J 2219/00006
See application file for complete search history.

(56) References Cited

U.S. PATENT DOCUMENTS

| | | | |
|---|---|---|---|
| 3,449,460 A | 6/1969 | Tarhan | |
| 3,702,292 A | 11/1972 | Burich | |
| 3,891,539 A | 6/1975 | Nelson et al. | |
| 4,302,323 A | 11/1981 | Chen | |
| 4,664,777 A * | 5/1987 | Hudson | B01J 23/78 208/112 |
| 4,789,457 A | 12/1988 | Ficher et al. | |
| 4,827,072 A | 5/1989 | Imai et al. | |
| 4,926,005 A | 5/1990 | Olbrich et al. | |
| 5,220,093 A * | 6/1993 | Gartside et al. | C07C 5/333 585/661 |
| 6,153,087 A | 11/2000 | Bigeard et al. | |
| 6,270,654 B1 | 8/2001 | Colyar et al. | |
| 7,214,308 B2 | 5/2007 | Colyar | |
| 7,513,988 B2 * | 4/2009 | Oballa | C10G 45/44 208/114 |
| 7,622,623 B2 | 11/2009 | Fridman et al. | |
| 7,704,377 B2 | 4/2010 | Duddy et al. | |
| 7,813,988 B2 | 10/2010 | Levin et al. | |
| 7,938,952 B2 | 5/2011 | Colyar et al. | |
| 8,926,824 B2 | 1/2015 | Morel | |
| 9,005,430 B2 | 4/2015 | Fournier et al. | |
| 9,840,674 B2 | 12/2017 | Weiss et al. | |
| 2003/0047486 A1* | 3/2003 | Cash | C10G 65/10 208/89 |
| 2003/0221990 A1 | 12/2003 | Yoon et al. | |
| 2006/0287561 A1* | 12/2006 | Choi | C10G 57/00 585/324 |
| 2007/0062848 A1 | 3/2007 | Oballa et al. | 208/113 |
| 2007/0090018 A1* | 4/2007 | Keusenkothen | C10G 9/007 208/106 |
| 2008/0093262 A1 | 4/2008 | Gragnani et al. | |
| 2011/0042269 A1 | 2/2011 | Kuechler et al. | |
| 2012/0205285 A1* | 8/2012 | Dindi | C10G 45/08 208/49 |
| 2014/0299515 A1 | 10/2014 | Weiss et al. | |
| 2016/0122666 A1 | 5/2016 | Weiss et al. | |

FOREIGN PATENT DOCUMENTS

| | | |
|---|---|---|
| EP | 0192059 A1 | 8/1986 |
| GB | 2162082 A | 1/1986 |
| JP | S49-14721 | 2/1974 |
| JP | S54-9230 | 1/1979 |
| JP | H05-194961 | 8/1993 |
| JP | H05-239472 | 9/1993 |
| JP | H06-79123 | 3/1994 |
| JP | 2008-544061 | 12/2008 |
| JP | 2009-508881 | 3/2009 |
| JP | 2010-174144 | 8/2010 |
| WO | 0244306 A1 | 6/2002 |
| WO | 2006137615 A1 | 12/2006 |
| WO | 2007055488 A1 | 5/2007 |
| WO | 2010102712 A2 | 9/2010 |
| WO | WO 2012/143972 | 10/2012 |
| WO | WO 2016/146326 | 9/2016 |

OTHER PUBLICATIONS

Alfke et al. (2007) Oil Refining, Ullmann's Encyclopedia of Industrial Chemistry.
International Search Report for International Application No. PCT/EP2014/063856; International Filing Date: Jun. 30, 2014; dated Oct. 13, 2014; 5 Pages.
International Union of Pure and Applied Chemistry, "Compendium of Chemical Terminology," Version 2.3.3 (Feb. 23, 2014) 1670 Pages.
Speight (2005) Petroleum Refinery Process, Kirk-Othmer Encyclopedia of Chemical Technology.
Written Opinion of the International Searching Authority for International Application No. PCT/EP2014/063856; International Filing Date: Jun. 30, 2014; dated Oct. 13, 2014; 6 Pages.
Office Action issued in European Patent Application No. 14735552.3, dated Feb. 20, 2018.
Office Action issued in Japanese Patent Application No. 2016-522566, dated Jun. 26, 2018.
Office Action issued in Corresponding Japanese Patent Application No. 2016-522566, dated Apr. 15, 2019 (Machine Translation).
Office Action issued in corresponding Japanese Patent Application No. 2018-220051, dated Dec. 11, 2019.

(56) References Cited

OTHER PUBLICATIONS

Eurasian Office Action issued in corresponding Eurasian Patent Application No. 201990641, dated Feb. 14, 2020.

* cited by examiner

PROCESS AND INSTALLATION FOR THE CONVERSION OF CRUDE OIL TO PETROCHEMICALS HAVING AN IMPROVED CARBON-EFFICIENCY

CROSS REFERENCE TO RELATED APPLICATIONS

This application is a 371 of International Application No. PCT/EP2014/063856, filed Jun. 30, 2014, which claims priority to European Application No. 13174759.4, filed Jul. 2, 2013 which are incorporated herein by reference in their entirety.

SUMMARY OF THE INVENTION

The present invention relates to an integrated process to convert crude oil into petrochemical products comprising crude oil distillation, hydrocracking and olefins synthesis. Furthermore, the present invention relates to a process installation to convert crude oil into petrochemical products comprising a crude distillation unit, a hydrocracker and a unit for olefins synthesis.

It has been previously described that a crude oil refinery can be integrated with downstream chemical plants such as a pyrolysis steam cracking unit in order to increase the production of high-value chemicals at the expense of the production of fuels.

U.S. Pat. No. 3,702,292 describes an integrated crude oil refinery arrangement for producing fuel and chemical products, involving crude oil distillation means, hydrocracking means, delayed coking means, reforming means, ethylene and propylene producing means comprising a pyrolysis steam cracking unit and a pyrolysis products separation unit, catalytic cracking means, aromatic product recovery means, butadiene recovery means and alkylation means in an interrelated system to produce a conversion of crude oil to petrochemicals of about 50% and a conversion of crude oil to fuels of about 50%.

A major drawback of conventional means and methods to integrate oil refinery operations with downstream chemical plants to produce petrochemicals is that such integrated processes still produce significant amounts of fuel. Furthermore, conventional means and methods to integrate oil refinery operations with downstream chemical plants have a relatively low carbon efficiency in terms of conversion of crude oil to into petrochemicals. U.S. Pat. No. 3,702,292, for instance, discloses a process having a carbon efficiency of less than 50 wt-% in terms of conversion of crude oil to petrochemicals.

It was an object of the present invention to provide means and methods to integrate oil refinery operations with downstream chemical plants which has an increased production of petrochemicals at the expense of the production of fuels and fuel gas. It was furthermore an object of the present invention to provide means and methods to integrate oil refinery operations with downstream chemical plants which has an improved carbon efficiency in terms of the conversion of crude oils into petrochemicals.

The solution to the above problem is achieved by providing the embodiments as described herein below.

In one aspect, the present invention relates to an integrated process to convert crude oil into petrochemical products. This process is also presented in FIGS. 1-4 which are further described herein below.

DETAILED DESCRIPTION

Figure 1:
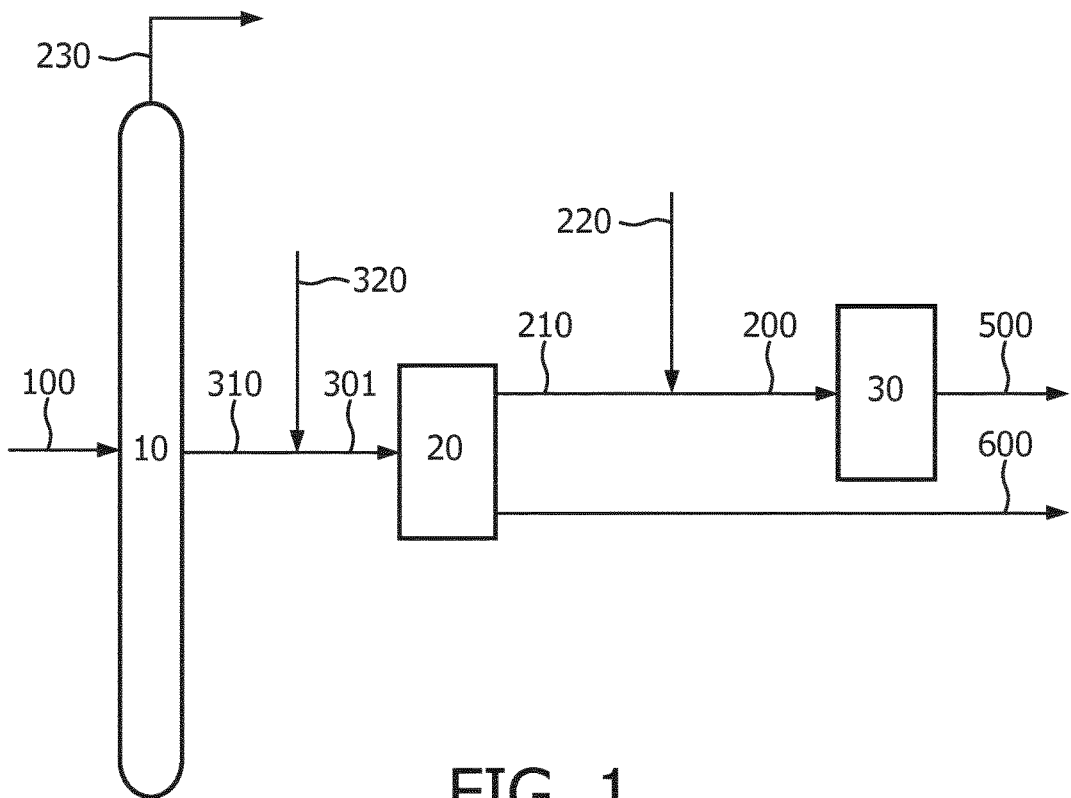
FIG. 1 depicts an embodiment of a process installation according to the present invention.

Accordingly, the present invention provides a process to convert crude oil into petrochemical products comprising crude oil distillation, hydrocracking and olefins synthesis, which process comprises subjecting a hydrocracker feed to hydrocracking to produce LPG and BTX and subjecting LPG produced in the process to olefins synthesis, wherein said hydrocracker feed comprises:

one or more of naphtha, kerosene and gasoil produced by crude oil distillation in the process; and refinery unit-derived light-distillate and/or refinery unit-derived middle-distillate produced in the process.

Conventionally, petrochemical products, such as C2 and C3 olefins, are produced by subjecting crude oil to crude oil distillation and to subject specific crude oil fractions thus obtained to a refinery process. In the context of the present invention, it was found that the carbon efficiency of an integrated process to convert crude oil into petrochemical products can be improved by hydrocracking one or more of naphtha, kerosene and gasoil, i.e. the C5+ hydrocarbons, to produce LPG and to subsequently convert the LPG produced by hydrocracking into olefins, when compared to a process wherein the same crude oil fractions are directly subjected to steam cracking. As used herein, the term "carbon efficiency in terms of the conversion of crude oils into petrochemicals" or "carbon efficiency" relates to the wt-% of carbon comprised in petrochemical products of the total carbon comprised in the crude, wherein said petrochemical products are selected from the group consisting of ethylene, propylene, butadiene, butylene-1, isobutylene, isoprene, cyclopentadiene (CPTD), benzene, toluene, xylene and ethylbenzene. Further advantages associated with the process of the present invention include a reduced capital expenditure, a higher molar ratio of propylene to ethylene and an improved production of BTX when compared to a method wherein petrochemicals are produced by subjecting crude oil fractions to liquid steam cracking.

Accordingly, the process of the present invention involves subjecting the C5+ hydrocarbons to hydrocracking to produce LPG and subjecting the thus obtained LPG to olefins synthesis. In the process of the present invention, the C+ hydrocarbons are preferably not subjected to olefins synthesis.

The term "one or more of naphtha, kerosene and gasoil produced by crude oil distillation in the process" means that said one or more of naphtha, kerosene and gasoil are produced by the crude distillation process step comprised in the integrated process of the present invention. Moreover, the term "refinery unit-derived light-distillate and/or refinery unit-derived middle-distillate produced in the process" means that said refinery unit-derived light-distillate and/or refinery unit-derived middle-distillate are produced by a refinery unit process step comprised in the integrated process of the present invention.

In the present invention, the hydrocracker feed comprises:

one or more of naphtha, kerosene and gasoil produced by crude oil distillation in the process; and refinery unit-derived light-distillate and/or refinery unit-derived middle-distillate produced in the process.

Preferably, the hydrocracker feed used in the present invention comprises:
two or more of naphtha, kerosene and gasoil produced by crude oil distillation in the process; and
refinery unit-derived light-distillate and/or refinery unit-derived middle-distillate produced in the process.

More preferably, the hydrocracker feed used in the present invention comprises:
naphtha, kerosene and gasoil produced by crude oil distillation in the process; and
refinery unit-derived light-distillate and/or refinery unit-derived middle-distillate produced in the process.

Particularly preferably, the hydrocracker feed used in the present invention comprises:
one or more of naphtha, kerosene and gasoil produced by crude oil distillation in the process; and
refinery unit-derived light-distillate and refinery unit-derived middle-distillate produced in the process.

More particularly preferably, the hydrocracker feed used in the present invention comprises:
two or more of naphtha, kerosene and gasoil produced by crude oil distillation in the process; and
refinery unit-derived light-distillate and refinery unit-derived middle-distillate produced in the process.

Most preferably, the hydrocracker feed used in the present invention comprises:
naphtha, kerosene and gasoil produced by crude oil distillation in the process; and
refinery unit-derived light-distillate and refinery unit-derived middle-distillate produced in the process.

The prior art describes processes for producing petrochemical products from specific hydrocarbon feeds such as specific crude oil fractions and/or refinery unit-derived distillates.

WO 2006/137615 A1, for instance, describes a process for increasing the production of C2-C4 light olefin hydrocarbons by integrating a process for producing a light olefin hydrocarbon carbon compound from a hydrocarbon feedstock comprising feeding said hydrocarbon feedstock into a pyrolysis furnace to conduct a pyrolysis reaction, feeding the separated pyrolysis gasolines produced in the pyrolysis reaction, a hydrocarbon feedstock and hydrogen in a reaction area to convert the hydrocarbon feedstock in the presence of a catalyst into an aromatic hydrocarbon compound and a non-aromatic hydrocarbon that is rich in LPG through a hydrocracking reaction. The reaction products of the hydrocracking reaction is subjected to gas-liquid separation wherein the resulting gaseous comprising ethane and LPG is circulated to the same compression and fractionation process used to separate the products produced in the pyrolysis reaction. WO 2006/137615 A1 further describes that the C2-C4 paraffins recovered in the compression and fractionation process used to separate the products produced in the pyrolysis reaction may be circulating into the pyrolysis furnace. The process of WO 2006/137615 A1 is inter alia characterized in that the hydrocarbon feedstock has a boiling point of 30-250° C. and may be selected from the group consisting of reformate, pyrolysis gasoline, fluidized catalytic cracking gasoline, C9+ aromatic-containing mixture, naphtha, and mixtures thereof. WO 2006/137615 A1 accordingly does not disclose an integrated process for converting crude oil into petrochemical products. Moreover, WO 2006/137615 A1 teaches that hydrocarbon feedstock should be directly subjected to liquid steam cracking. Hence, WO 2006/137615 A1 does not teach that it would be advantageous to first subject the hydrocarbon feedstock to hydrocracking to produce LPG and to subject the thus obtained LPG to olefins synthesis instead of subjecting said hydrocarbon feedstock directly to olefins synthesis.

US 2007/0062848 A1 describes process to treat hydrocarbon compounds comprising two or more fused aromatic rings to saturate at least one ring and then cleave the resulting saturated ring from the aromatic portion of the compound to produce a C2-4 alkane stream and an aromatic stream. The C2-4 alkane stream produced in the process is fed to a hydrocarbon cracker so that the hydrogen from the cracker may be used to saturate and cleave the compounds comprising two or more fused aromatic rings. WO 2006/137615 A1 does not disclose that crude oil fractions such as naphtha and diesel or distillates produced in the process, such as catalytic cracker gasoline or aromatic ring cleavage unit-derived gasoline, can be subjected to hydrocracking to produce LPG and BTX.

US 2003/0221990 A1 describes a multi-stage hydrocracking process in which light products from the first stage, such as naphtha, kerosene and diesel, are joined with naphtha, kerosene and diesel from other sources and recycled from fractionation to a second stage (or subsequent stage) hydrocracker in order to produce lighter products, such as gas and naphtha. US 2003/0221990 A1 does not disclose olefins synthesis.

U.S. Pat. No. 3,891,539 describes a hydrocracking process for converting heavy hydrocarbon oil into fuels. The process of U.S. Pat. No. 3,891,539 inter alia comprises hydrocracking heavy hydrocarbon oil charge in a first hydrocracking zone in the presence of a porous hydrocracking catalyst to mainly gas-oil and hydrocracking the thus obtained gas-oil in a second hydrocracking zone to produce gasoline. U.S. Pat. No. 3,891,539 does not disclose process steps suitable for the production of petrochemicals such as BTX or olefins.

U.S. Pat. No. 3,449,460 describes a process for upgrading aromatic hydrocarbon feedstock having a boiling point of up to 200° C. comprising separating said feedstock into a first fraction boiling between 80° C. and 120° C. and a second fraction boiling between 120° C. and 200° C. and subjecting the first fraction to a first and subsequent stages of a hydro-upgrading zone, subjecting said second fraction into a hydrogenation zone and supplying the hydrogenated fraction to a second stage of a hydro-upgrading zone. U.S. Pat. No. 3,449,460 does not disclose a process for converting hydrocarbons having a boiling point of 200° C. or more. Moreover, U.S. Pat. No. 3,449,460 does not disclose olefins synthesis.

The term "crude oil" as used herein refers to the petroleum extracted from geologic formations in its unrefined form. The term crude oil will also be understood to include that which has been subjected to water-oil separations and/or gas-oil separation and/or desalting and/or stabilization. Any crude oil is suitable as the source material for the process of this invention, including Arabian Heavy, Arabian Light, other Gulf crudes, Brent, North Sea crudes, North and West African crudes, Indonesian, Chinese crudes and mixtures thereof, but also shale oil, tar sands, gas condensates and bio-based oils. The crude oil used as feed to the process of the present invention preferably is conventional petroleum having an API gravity of more than 20° API as measured by the ASTM D287 standard. More preferably, the crude oil used in the process of the present invention is a light crude oil having an API gravity of more than 30° API. Most preferably, the crude oil used in the process of the present invention comprises Arabian Light Crude Oil. Arabian Light Crude Oil typically has an API gravity of between 32-36° API and a sulfur content of between 1.5-4.5 wt-%.

The term "petrochemicals" or "petrochemical products" as used herein relates to chemical products derived from crude oil that are not used as fuels. Petrochemical products include olefins and aromatics that are used as a basic feedstock for producing chemicals and polymers. High-value petrochemicals include olefins and aromatics. Typical high-value olefins include, but are not limited to, ethylene, propylene, butadiene, butylene-1, isobutylene, isoprene, cyclopentadiene and styrene. Typical high-value aromatics include, but are not limited to, benzene, toluene, xylene and ethyl benzene.

The term "fuels" as used herein relates to crude oil-derived products used as energy carrier. Unlike petrochemicals, which are a collection of well-defined compounds, fuels typically are complex mixtures of different hydrocarbon compounds. Fuels commonly produced by oil refineries include, but are not limited to, gasoline, jet fuel, diesel fuel, heavy fuel oil and petroleum coke.

The term "gases produced by the crude distillation unit" or "gases fraction" as used herein refers to the fraction obtained in a crude oil distillation process that is gaseous at ambient temperatures. Accordingly, the "gases fraction" derived by crude distillation mainly comprises C1-C4 hydrocarbons and may further comprise impurities such as hydrogen sulfide and carbon dioxide. In this specification, other petroleum fractions obtained by crude oil distillation are referred to as "naphtha", "kerosene", "gasoil" and "resid". The terms naphtha, kerosene, gasoil and resid are used herein having their generally accepted meaning in the field of petroleum refinery processes; see Alfke et al. (2007) Oil Refining, Ullmann's Encyclopedia of Industrial Chemistry and Speight (2005) Petroleum Refinery Processes, Kirk-Othmer Encyclopedia of Chemical Technology. In this respect, it is to be noted that there may be overlap between the different crude oil distillation fractions due to the complex mixture of the hydrocarbon compounds comprised in the crude oil and the technical limits to the crude oil distillation process. Preferably, the term "naphtha" as used herein relates to the petroleum fraction obtained by crude oil distillation having a boiling point range of about 20-200° C., more preferably of about 30-190° C. Preferably, light naphtha is the fraction having a boiling point range of about 20-100° C., more preferably of about 30-90° C. Heavy naphtha preferably has a boiling point range of about 80-200° C., more preferably of about 90-190° C. Preferably, the term "kerosene" as used herein relates to the petroleum fraction obtained by crude oil distillation having a boiling point range of about 180-270° C., more preferably of about 190-260° C. Preferably, the term "gasoil" as used herein relates to the petroleum fraction obtained by crude oil distillation having a boiling point range of about 250-360° C., more preferably of about 260-350° C. Preferably, the term "resid" as used herein relates to the petroleum fraction obtained by crude oil distillation having a boiling point of more than about 340° C., more preferably of more than about 350° C.

As used herein, the term "refinery unit" relates to a section of a petrochemical plant complex for the chemical conversion of crude oil to petrochemicals and fuels. In this respect, it is to be noted that a unit for olefins synthesis, such as a steam cracker, is also considered to represent a "refinery unit". In this specification, different hydrocarbons streams produced by refinery units or produced in refinery unit operations are referred to as: refinery unit-derived gases, refinery unit-derived light-distillate, refinery unit-derived middle-distillate and refinery unit-derived heavy-distillate. Accordingly, a refinery unit derived distillate is obtained as the result of a chemical conversion followed by a separation, e.g. by distillation or by extraction, which is in contrast to a crude oil fraction. The term "refinery unit-derived gases" relates to the fraction of the products produced in a refinery unit that is gaseous at ambient temperatures. Accordingly, the refinery unit-derived gas stream may comprise gaseous compounds such as LPG and methane. Other components comprised in the refinery unit-derived gas stream may be hydrogen and hydrogen sulfide. The terms light-distillate, middle-distillate and heavy-distillate are used herein having their generally accepted meaning in the field of petroleum refinery processes; see Speight, J. G. (2005) loc.cit. In this respect, it is to be noted that there may be overlap between different distillation fractions due to the complex mixture of the hydrocarbon compounds comprised in the product stream produced by refinery unit operations and the technical limits to the distillation process used to separate the different fractions. Preferably, the refinery-unit derived light-distillate is the hydrocarbon distillate obtained in a refinery unit process having a boiling point range of about 20-200° C., more preferably of about 30-190° C. The "light-distillate" is often relatively rich in aromatic hydrocarbons having one aromatic ring.

Preferably, the refinery-unit derived middle-distillate is the hydrocarbon distillate obtained in a refinery unit process having a boiling point range of about 180-360° C., more preferably of about 190-350° C. The "middle-distillate" is relatively rich in aromatic hydrocarbons having two aromatic rings. Preferably, the refinery-unit derived heavy-distillate is the hydrocarbon distillate obtained in a refinery unit process having a boiling point of more than about 340° C., more preferably of more than about 350° C. The "heavy-distillate" is relatively rich in hydrocarbons having condensed aromatic rings.

The term "alkane" or "alkanes" is used herein having its established meaning and accordingly describes acyclic branched or unbranched hydrocarbons having the general formula $C_nH_{2n+2}$, and therefore consisting entirely of hydrogen atoms and saturated carbon atoms; see e.g. IUPAC. Compendium of Chemical Terminology, 2nd ed. (1997). The term "alkanes" accordingly describes unbranched alkanes ("normal-paraffins" or "n-paraffins" or "n-alkanes") and branched alkanes ("iso-paraffins" or "iso-alkanes") but excludes naphthenes (cycloalkanes).

The term "aromatic hydrocarbons" or "aromatics" is very well known in the art. Accordingly, the term "aromatic hydrocarbon" relates to cyclically conjugated hydrocarbon with a stability (due to delocalization) that is significantly greater than that of a hypothetical localized structure (e.g. Kekulé structure). The most common method for determining aromaticity of a given hydrocarbon is the observation of diatropicity in the 1H NMR spectrum, for example the presence of chemical shifts in the range of from 7.2 to 7.3 ppm for benzene ring protons.

The terms "naphthenic hydrocarbons" or "naphthenes" or "cycloalkanes" is used herein having its established meaning and accordingly describes saturated cyclic hydrocarbons.

The term "olefin" is used herein having its well-established meaning. Accordingly, olefin relates to an unsaturated hydrocarbon compound containing at least one carbon-carbon double bond. Preferably, the term "olefins" relates to a mixture comprising two or more of ethylene, propylene, butadiene, butylene-1, isobutylene, isoprene and cyclopentadiene.

The term "LPG" as used herein refers to the well-established acronym for the term "liquefied petroleum gas".

LPG generally consists of a blend of C2-C4 hydrocarbons i.e. a mixture of C2, C3, and C4 hydrocarbons.

One of the petrochemical products produced in the process of the present invention is BTX. The term "BTX" as used herein relates to a mixture of benzene, toluene and xylenes. Preferably, the product produced in the process of the present invention comprises further useful aromatic hydrocarbons such as ethylbenzene. Accordingly, the present invention preferably provides a process for producing a mixture of benzene, toluene xylenes and ethylbenzene ("BTXE"). The product as produced may be a physical mixture of the different aromatic hydrocarbons or may be directly subjected to further separation, e.g. by distillation, to provide different purified product streams. Such purified product stream may include a benzene product stream, a toluene product stream, a xylene product stream and/or an ethylbenzene product stream.

As used herein, the term "C # hydrocarbons", wherein "#" is a positive integer, is meant to describe all hydrocarbons having # carbon atoms. Moreover, the term "C #+ hydrocarbons" is meant to describe all hydrocarbon molecules having # or more carbon atoms. Accordingly, the term "C5+ hydrocarbons" is meant to describe a mixture of hydrocarbons having 5 or more carbon atoms. The term "C5+ alkanes" accordingly relates to alkanes having 5 or more carbon atoms.

The process of the present invention involves crude distillation, which comprises separating different crude oil fractions based on a difference in boiling point. As used herein, the term "crude distillation unit" or "crude oil distillation unit" relates to the fractionating column that is used to separate crude oil into fractions by fractional distillation; see Alfke et al. (2007) loc.cit. Preferably, the crude oil is processed in an atmospheric distillation unit to separate gas oil and lighter fractions from higher boiling components (atmospheric residuum or "resid"). In the present invention, it is not required to pass the resid to a vacuum distillation unit for further fractionation of the resid, and it is possible to process the resid as a single fraction. In case of relatively heavy crude oil feeds, however, it may be advantageous to further fractionate the resid using a vacuum distillation unit to further separate the resid into a vacuum gas oil fraction and vacuum residue fraction. In case vacuum distillation is used, the vacuum gas oil fraction and vacuum residue fraction may be processed separately in the subsequent refinery units. For instance, the vacuum residue fraction may be specifically subjected to solvent deasphalting before further processing. Preferably, the term "vacuum gas oil" as used herein relates to the petroleum fraction obtained by crude oil distillation having a having a boiling point range of about 340-560° C., more preferably of about 350-550° C. Preferably, the term "vacuum resid" as used herein relates to the petroleum fraction obtained by crude oil distillation having a boiling point of more than about 540° C., more preferably of more than about 550° C.

As used herein, the term "hydrocracker unit" or "hydrocracker" relates to a refinery unit in which a hydrocracking process is performed i.e. a catalytic cracking process assisted by the presence of an elevated partial pressure of hydrogen; see e.g. Alfke et al. (2007) loc.cit. The products of this process are saturated hydrocarbons, naphthenic (cycloalkane) hydrocarbons and, depending on the reaction conditions such as temperature, pressure and space velocity and catalyst activity, aromatic hydrocarbons including BTX. The process conditions used for hydrocracking generally includes a process temperature of 200-600° C., elevated pressures of 0.2-20 MPa, space velocities between 0.1-10 $h^{-1}$. Hydrocracking reactions proceed through a bifunctional mechanism which requires an acid function, which provides for the cracking and isomerization and which provides breaking and/or rearrangement of the carbon-carbon bonds comprised in the hydrocarbon compounds comprised in the feed, and a hydrogenation function. Many catalysts used for the hydrocracking process are formed by combining various transition metals, or metal sulfides with the solid support such as alumina, silica, alumina-silica, magnesia and zeolites.

The hydrocracker feed used in the process of the present invention preferably comprises naphtha, kerosene and gasoil produced by crude oil distillation in the process and refinery unit-derived light-distillate and refinery unit-derived middle-distillate produced in the process.

The LPG produced in the process that is subjected to olefins synthesis preferably comprises LPG comprised in the gases fraction derived by crude distillation and LPG comprised in the refinery unit-derived gases.

Preferably, the process of the present invention comprises subjecting refinery unit-derived light-distillate and naphtha to hydrocracking and subjecting refinery unit-derived middle-distillate and one or more selected from the group consisting of kerosene and gasoil to aromatic ring opening.

By specifically subjecting the refinery unit-derived middle-distillate and one or more selected from the group consisting of kerosene and gasoil to aromatic ring opening, the carbon efficiency of the process of the present invention can be further improved. Preferably, the light-distillate produced by aromatic ring opening is combined with the naphtha and subjected to hydrocracking.

The "aromatic ring opening unit" refers to a refinery unit wherein the aromatic ring opening process is performed. Aromatic ring opening is a specific hydrocracking process that is particularly suitable for converting a feed that is relatively rich in aromatic hydrocarbon having a boiling point in the kerosene and gasoil boiling point range, and optionally the vacuum gasoil boiling point range, to produce LPG and, depending on the specific process and/or process conditions, a light-distillate (ARO-derived gasoline). Such an aromatic ring opening process (ARO process) is for instance described in U.S. Pat. Nos. 3,256,176 and 4,789,457. Such processes may comprise of either a single fixed bed catalytic reactor or two such reactors in series together with one or more fractionation units to separate desired products from unconverted material and may also incorporate the ability to recycle unconverted material to one or both of the reactors. Reactors may be operated at a temperature of 200-600° C., preferably 300-400° C., a pressure of 3-35 MPa, preferably 5 to 20 MPa together with 5-20 wt-% of hydrogen (in relation to the hydrocarbon feedstock), wherein said hydrogen may flow co-current with the hydrocarbon feedstock or counter current to the direction of flow of the hydrocarbon feedstock, in the presence of a dual functional catalyst active for both hydrogenation-dehydrogenation and ring cleavage, wherein said aromatic ring saturation and ring cleavage may be performed. Catalysts used in such processes comprise one or more elements selected from the group consisting of Pd, Rh, Ru, Ir, Os, Cu, Co, Ni, Pt, Fe, Zn, Ga, In, Mo, W and V in metallic or metal sulphide form supported on an acidic solid such as alumina, silica, alumina-silica and zeolites. In this respect, it is to be noted that the term "supported on" as used herein includes any conventional way to provide a catalyst which combines one or more elements with a catalytic support. By adapting either single or in combination the catalyst composition, operating temperature, operating space velocity and/or hydrogen partial pressure, the process can be steered towards full saturation and subsequent cleavage of all rings or towards keeping one aromatic ring unsaturated and subsequent cleavage of all but one ring. In the latter case, the ARO process produces a light-distillate ("ARO-gasoline") which is relatively rich in hydrocarbon compounds having one aromatic and or naphthenic ring. In the context of the present invention, it is preferred to use an aromatic ring opening process that is optimized to keep one aromatic or naphthenic ring intact and thus to produce a light-distillate which is relatively rich in hydrocarbon compounds having one aromatic or naphthenic ring. A further aromatic ring opening process (ARO process) is described in U.S. Pat. No. 7,513,988. Accordingly, the ARO process may comprise aromatic ring saturation at a temperature of 100-500° C., preferably 200-500° C., more preferably 300-500° C., a pressure of 2-10 MPa together with 5-30 wt-%, preferably 10-30 wt-% of hydrogen (in relation to the hydrocarbon feedstock) in the presence of an aromatic hydrogenation catalyst and ring cleavage at a temperature of 200-600° C., preferably 300-400° C., a pressure of 1-12 MPa together with 5-20 wt-% of hydrogen (in relation to the hydrocarbon feedstock) in the presence of a ring cleavage catalyst, wherein said aromatic ring saturation and ring cleavage may be performed in one reactor or in two consecutive reactors. The aromatic hydrogenation catalyst may be a conventional hydrogenation/hydrotreating catalyst such as a catalyst comprising a mixture of Ni, W and Mo on a refractory support, typically alumina. The ring cleavage catalyst comprises a transition metal or metal sulphide component and a support. Preferably the catalyst comprises one or more elements selected from the group consisting of Pd, Rh, Ru, Ir, Os, Cu, Co, Ni, Pt, Fe, Zn, Ga, In, Mo, W and V in metallic or metal sulphide form supported on an acidic solid such as alumina, silica, alumina-silica and zeolites. By adapting either single or in combination the catalyst composition, operating temperature, operating space velocity and/or hydrogen partial pressure, the process can be steered towards full saturation and subsequent cleavage of all rings or towards keeping one aromatic ring unsaturated and subsequent cleavage of all but one ring. In the latter case, the ARO process produces a light-distillate ("ARO-gasoline") which is relatively rich in hydrocarbon compounds having one aromatic ring. In the context of the present invention, it is preferred to use an aromatic ring opening process that is optimized to keep one aromatic ring intact and thus to produce a light-distillate which is relatively rich in hydrocarbon compounds having one aromatic ring.

Preferably, the process of the present invention comprises:
(a) subjecting crude oil to crude oil distillation to produce gases fraction, naphtha, kerosene, gasoil and resid;
(b) subjecting resid to resid upgrading to produce LPG, light-distillate and middle-distillate;
(c) subjecting middle-distillate produced by resid upgrading and one or more selected from the group consisting of kerosene and gasoil to aromatic ring opening to produce LPG and light-distillate;
(d) subjecting light-distillate produced by resid upgrading, light-distillate produced by aromatic ring opening and naphtha to hydrocracking to produce LPG and BTX; and
(e) subjecting LPG produced in the integrated process to olefins synthesis.

By specifically subjecting resid to resid upgrading to produce LPG, light-distillate and middle-distillate and by subjecting light-distillate and middle-distillate to hydrocracking to ultimately produce LPG and BTX, the carbon efficiency of the process of the present invention can be further improved.

As used herein, the term "resid upgrading unit" relates to a refinery unit suitable for the process of resid upgrading, which is a process for breaking the hydrocarbons comprised in the resid and/or refinery unit-derived heavy-distillate into lower boiling point hydrocarbons; see Alfke et al. (2007) loc.cit. Commercially available technologies include a delayed coker, a fluid coker, a resid FCC, a Flexicoker, a visbreaker or a catalytic hydrovisbreaker. Preferably, the resid upgrading unit may be a coking unit or a resid hydrocracker. A "coking unit" is an oil refinery processing unit that converts resid into LPG, light-distillate, middle-distillate, heavy-distillate and petroleum coke. The process thermally cracks the long chain hydrocarbon molecules in the residual oil feed into shorter chain molecules.

The feed to resid upgrading preferably comprises resid and heavy-distillate produced in the process. Such heavy-distillate may comprise the heavy-distillate produced by a steam cracker, such as carbon black oil and/or cracked distillate but may also comprise the heavy distillate produced by resid upgrading, which may be recycled to extinction. Yet, a relatively small pitch stream may be purged from the process.

Preferably, the resid upgrading used in the process of the present invention is resid hydrocracking.

By selecting resid hydrocracking over other means for resid upgrading, the carbon efficiency of the process of the present invention can be further improved.

A "resid hydrocracker" is an oil refinery processing unit that is suitable for the process of resid hydrocracking, which is a process to convert resid into LPG, light distillate, middle-distillate and heavy-distillate. Resid hydrocracking processes are well known in the art; see e.g. Alfke et al. (2007) loc.cit. Accordingly, 3 basic reactor types are employed in commercial hydrocracking which are a fixed bed (trickle bed) reactor type, an ebullated bed reactor type and slurry (entrained flow) reactor type. Fixed bed resid hydrocracking processes are well-established and are capable of processing contaminated streams such as atmospheric residues and vacuum residues to produce light- and middle-distillate which can be further processed to produce olefins and aromatics. The catalysts used in fixed bed resid hydrocracking processes commonly comprise one or more elements selected from the group consisting of Co, Mo and Ni on a refractory support, typically alumina. In case of highly contaminated feeds, the catalyst in fixed bed resid hydrocracking processes may also be replenished to a certain extend (moving bed). The process conditions commonly comprise a temperature of 350-450° C. and a pressure of 2-20 MPa gauge. Ebullated bed resid hydrocracking processes are also well-established and are inter alia characterized in that the catalyst is continuously replaced allowing the processing of highly contaminated feeds. The catalysts used in ebullated bed resid hydrocracking processes commonly comprise one or more elements selected from the group consisting of Co, Mo and Ni on a refractory support, typically alumina. The small particle size of the catalysts employed effectively increases their activity (c.f. similar formulations in forms suitable for fixed bed applications). These two factors allow ebullated bed hydrocracking processes to achieve significantly higher yields of light products and higher levels of hydrogen addition when compared to fixed bed hydrocracking units. The process conditions commonly comprise a temperature of 350-450° C. and a pressure of 5-25 MPa gauge. Slurry resid hydrocracking processes represent a combination of thermal cracking and catalytic hydrogenation to achieve high yields of distillable products from highly contaminated resid feeds. In the first liquid stage, thermal cracking and hydrocracking reactions occur simultaneously in the fluidized bed at process conditions that include a temperature of 400-500° C. and a pressure of 15-25 MPa gauge. Resid, hydrogen and catalyst are introduced at the bottom of the reactor and a fluidized bed is formed, the height of which depends on flow rate and desired conversion. In these processes catalyst is continuously replaced to achieve consistent conversion levels through an operating cycle. The catalyst may be an unsupported metal sulfide that is generated in situ within the reactor. In practice the additional costs associated with the ebullated bed and slurry phase reactors are only justified when a high conversion of highly contaminated heavy streams such as vacuum gas oils is required. Under these circumstances the limited conversion of very large molecules and the difficulties associated with catalyst deactivation make fixed bed processes relatively unattractive in the process of the present invention. Accordingly, ebullated bed and slurry reactor types are preferred due to their improved yield of light- and middle-distillate when compared to fixed bed hydrocracking. As used herein, the term "resid upgrading liquid effluent" relates to the product produced by resid upgrading excluding the gaseous products, such as methane and LPG and the heavy distillate produced by resid upgrading. The heavy-distillate produced by resid upgrading is preferably recycled to the resid upgrading unit until extinction. However, it may be necessary to purge a relatively small pitch stream. From the viewpoint of carbon efficiency, a resid hydrocracker is preferred over a coking unit as the latter produces considerable amounts of petroleum coke that cannot be upgraded to high value petrochemical products. From the viewpoint of the hydrogen balance of the integrated process, it may be preferred to select a coking unit over a resid hydrocracker as the latter consumes considerable amounts of hydrogen. Also in view of the capital expenditure and/or the operating costs it may be advantageous to select a coking unit over a resid hydrocracker.

In case the resid is further fractionated using a vacuum distillation unit to separate the resid into a vacuum gas oil fraction and vacuum residue fraction, it is preferred to subject the vacuum gasoil to vacuum gasoil hydrocracking and the vacuum resid to vacuum resid hydrocracking, wherein the heavy distillate produced by vacuum resid hydrocracking is subsequently subjected to vacuum gasoil hydrocracking. In case the present invention involves vacuum distillation, the vacuum gasoil thus obtained is preferably fed to the aromatic ring opening unit together with one or more other hydrocarbon streams that are relatively rich in aromatic hydrocarbons and which have a boiling point in the kerosene and gasoil boiling point range. Such hydrocarbon streams that are relatively rich in aromatic hydrocarbons and which have a boiling point in the kerosene and gasoil boiling point range may be selected from the group consisting of kerosene, gasoil and middle-distillate. The vacuum residue hydrocracking preferably is slurry resid hydrocracking as defined herein above.

Preferably at least 50 wt-%, more preferably at least 60 wt-%, even more preferably at least 70 wt-%, particularly preferably at least 80 wt-%, more particularly preferably at least 90 wt-% and most preferably at least 95 wt-% of the combined naphtha, kerosene and gasoil produced by the crude oil distillation in the process is subjected to hydrocracking. Accordingly, preferably less than 50 wt-%, more preferably less than 40 wt-%, even more preferably less than 30 wt-%, particularly preferably less than 20 wt-%, more particularly preferably less than 10 wt-% and most preferably less 5 wt-% of the crude oil is converted into fuels in the process of the present invention.

As used herein, the term "unit for olefins synthesis" relates to a unit wherein a process for the conversion of alkanes to olefins is performed. This term includes any process for the conversion of hydrocarbons to olefins including, but not limited to non-catalytic processes such as pyrolysis or steam cracking, catalytic processes such as propane dehydrogenation or butane dehydrogenation, and combinations of the two such as catalytic steam cracking.

A very common process for olefins synthesis involves "steam cracking". As used herein, the term "steam cracking" relates to a petrochemical process in which saturated hydrocarbons are broken down into smaller, often unsaturated, hydrocarbons such as ethylene and propylene. In steam cracking gaseous hydrocarbon feeds like ethane, propane and butanes, or mixtures thereof, (gas cracking) or liquid hydrocarbon feeds like naphtha or gasoil (liquid cracking) is diluted with steam and briefly heated in a furnace without the presence of oxygen. Typically, the reaction temperature is 750-900° C. and the reaction is only allowed to take place very briefly, usually with residence times of 50-1000 milliseconds. Preferably, a relatively low process pressure is to be selected of atmospheric up to 175 kPa gauge. Preferably, the hydrocarbon compounds ethane, propane and butanes are separately cracked in accordingly specialized furnaces to ensure cracking at optimal conditions. After the cracking temperature has been reached, the gas is quickly quenched to stop the reaction in a transfer line heat exchanger or inside a quenching header using quench oil. Steam cracking results in the slow deposition of coke, a form of carbon, on the reactor walls. Decoking requires the furnace to be isolated from the process and then a flow of steam or a steam/air mixture is passed through the furnace coils. This converts the hard solid carbon layer to carbon monoxide and carbon dioxide. Once this reaction is complete, the furnace is returned to service. The products produced by steam cracking depend on the composition of the feed, the hydrocarbon to steam ratio and on the cracking temperature and furnace residence time. Light hydrocarbon feeds such as ethane, propane, butane or light naphtha give product streams rich in the lighter polymer grade olefins, including ethylene, propylene, and butadiene. Heavier hydrocarbon (full range and heavy naphtha and gas oil fractions) also give products rich in aromatic hydrocarbons.

To separate the different hydrocarbon compounds produced by steam cracking the cracked gas is subjected to a fractionation unit. Such fractionation units are well known in the art and may comprise a so-called gasoline fractionator where the heavy-distillate ("carbon black oil") and the middle-distillate ("cracked distillate") are separated from the light-distillate and the gases. In the subsequent optional quench tower, most of the light-distillate produced by steam cracking ("pyrolysis gasoline" or "pygas") may be separated from the gases by condensing the light-distillate. Subsequently, the gases may be subjected to multiple compression stages wherein the remainder of the light distillate may be separated from the gases between the compression stages. Also acid gases ($CO_2$ and $H_2S$) may be removed between compression stages. In a following step, the gases produced by pyrolysis may be partially condensed over stages of a cascade refrigeration system to about where only the hydrogen remains in the gaseous phase. The different hydrocarbon compounds may subsequently be separated by simple distillation, wherein the ethylene, propylene and C4 olefins are the most important high-value chemicals produced by steam cracking. The methane produced by steam cracking is generally used as fuel gas, the hydrogen may be separated and recycled to processes that consume hydrogen, such as hydrocracking processes. The acetylene produced by steam cracking preferably is selectively hydrogenated to ethylene. The alkanes comprised in the cracked gas may be recycled to the process for olefins synthesis. Preferably, the olefin synthesis employed in the process of the present invention is selected from the group consisting of gas cracking (pyrolysis of C2-C4 hydrocarbons) and dehydrogenation of C3-C4 hydrocarbons. Accordingly, the process of the present invention preferably does not comprise liquid cracking (pyrolysis of C5+ hydrocarbons). In the context of the present invention, it was found that the carbon efficiency of an integrated process to convert crude oil into petrochemical products can be improved by converting one or more of naphtha, kerosene and gasoil to LPG and to subsequently subject said LPG to olefins synthesis, when compared to a process wherein the same crude oil fractions are directly subjected to liquid cracking.

Accordingly, the present invention provides an integrated process to convert crude oil into petrochemical products comprising crude oil distillation, hydrocracking and olefins synthesis, which process comprises subjecting a hydrocracker feed to hydrocracking to produce LPG and BTX and subjecting LPG produced in the process to olefins synthesis, wherein said hydrocracker feed comprises:

one or more of naphtha, kerosene and gasoil produced by crude oil distillation in the process; and refinery unit-derived light-distillate and/or refinery unit-derived middle-distillate produced in the process, wherein said olefins synthesis is selected from the group consisting of pyrolysis of ethane, pyrolysis of propane, pyrolysis of butane, dehydrogenation of propane and dehydrogenation of butane.

Preferably, the olefins synthesis comprises pyrolysis of ethane and dehydrogenation of propane. By converting one or more of naphtha, kerosene and gasoil produced by crude oil distillation in the process; and refinery unit-derived light-distillate and/or refinery unit-derived middle-distillate produced in the process to LPG, the propane comprised in the LPG can be subjected to propane dehydrogenation to produce propylene and hydrogen, which is a much more carbon efficient method for producing olefins when compared to pyrolysis since in a propane dehydrogenation process, substantially no methane is produced.

By selecting olefins synthesis comprising propane dehydrogenation, the overall hydrogen balance of the integrated process can be improved. A further advantage of integrating dehydrogenation process into integrated process is that a high-purity hydrogen stream is produced, which can be used as feed to hydrocracker/aromatic ring opening without expensive purification.

The term "propane dehydrogenation unit" as used herein relates to a petrochemical process unit wherein a propane feedstream is converted into a product comprising propylene and hydrogen. Accordingly, the term "butane dehydrogenation unit" relates to a process unit for converting a butane feedstream into C4 olefins. Together, processes for the dehydrogenation of lower alkanes such as propane and butanes are described as lower alkane dehydrogenation process. Processes for the dehydrogenation of lower alkanes are well-known in the art and include oxidative dehydrogenation processes and non-oxidative dehydrogenation processes. In an oxidative dehydrogenation process, the process heat is provided by partial oxidation of the lower alkane(s) in the feed. In a non-oxidative dehydrogenation process, which is preferred in the context of the present invention, the process heat for the endothermic dehydrogenation reaction is provided by external heat sources such as hot flue gases obtained by burning of fuel gas or steam. In a non-oxidative dehydrogenation process the process conditions generally comprise a temperature of 540-700° C. and an absolute pressure of 25-500 kPa. For instance, the UOP Oleflex process allows for the dehydrogenation of propane to form propylene and of (iso)butane to form (iso)butylene (or mixtures thereof) in the presence of a catalyst containing platinum supported on alumina in a moving bed reactor; see e.g. U.S. Pat. No. 4,827,072. The Uhde STAR process allows for the dehydrogenation of propane to form propylene or of butane to form butylene in the presence of a promoted platinum catalyst supported on a zinc-alumina spinel; see e.g. U.S. Pat. No. 4,926,005. The STAR process has been recently improved by applying the principle of oxydehydrogenation. In a secondary adiabatic zone in the reactor part of the hydrogen from the intermediate product is selectively converted with added oxygen to form water. This shifts the thermodynamic equilibrium to higher conversion and achieves a higher yield. Also the external heat required for the endothermic dehydrogenation reaction is partly supplied by the exothermic hydrogen conversion. The Lummus Catofin process employs a number of fixed bed reactors operating on a cyclical basis. The catalyst is activated alumina impregnated with 18-20 wt-% chromium; see e.g. EP 0 192 059 A1 and GB 2 162 082 A. The Catofin process has the advantage that it is robust and capable of handling impurities which would poison a platinum catalyst. The products produced by a butane dehydrogenation process depend on the nature of the butane feed and the butane dehydrogenation process used. Also the Catofin process allows for the dehydrogenation of butane to form butylene; see e.g. U.S. Pat. No. 7,622,623.

Preferably, the olefins synthesis further comprises dehydrogenation of butane. One or more of the butane species such as isobutane or butane-1 comprised in the LPG can be subjected to butane dehydrogenation to produce butylenes and hydrogen, which is a much more carbon efficient method for producing olefins when compared to pyrolysis since in a butane dehydrogenation process, substantially no methane is produced.

In case the process of the present invention comprises both dehydrogenation of propane and dehydrogenation of butane, a mixture of propane and butane may be used as a feed for a combined propane/butane dehydrogenation process.

Accordingly, the combination of hydrocracking to prepare LPG in combination with the dehydrogenation of propane and/or butane is particularly preferred in the process of the present invention since only by hydrocracking a significant part of the crude oil is converted into propane and butane, which then can be very efficiently can be converted into the high-value petrochemicals propylene and butylenes.

Accordingly, the present invention provides an integrated process to convert crude oil into petrochemical products comprising crude oil distillation, hydrocracking and olefins synthesis, which process comprises subjecting a hydrocracker feed to hydrocracking to produce LPG and BTX and subjecting LPG produced in the process to olefins synthesis, wherein said hydrocracker feed comprises:

one or more of naphtha, kerosene and gasoil produced by crude oil distillation in the process; and refinery unit-derived light-distillate and/or refinery unit-derived middle-distillate produced in the process, wherein the olefins synthesis comprises pyrolysis of ethane and dehydrogenation of propane.

Preferably, the gases fraction produced by the crude distillation unit and the refinery unit-derived gases are subjected to gas separation to separate the different components, for instance to separate methane from LPG.

As used herein, the term "gas separation unit" relates to the refinery unit that separates different compounds comprised in the gases produced by the crude distillation unit and/or refinery unit-derived gases. Compounds that may be separated to separate streams in the gas separation unit comprise ethane, propane, butanes, hydrogen and fuel gas mainly comprising methane. Any conventional method suitable for the separation of said gases may be employed in the context of the present invention. Accordingly, the gases may be subjected to multiple compression stages wherein acid gases such as $CO_2$ and $H_2S$ may be removed between compression stages. In a following step, the gases produced may be partially condensed over stages of a cascade refrigeration system to about where only the hydrogen remains in the gaseous phase. The different hydrocarbon compounds may subsequently be separated by distillation.

Preferably, the process of the present invention further comprises subjecting naphtha to a first hydrocracking process to produce LPG and BTX and subjecting at least a portion of the refinery unit-derived light-distillate to a different second hydrocracking process to produce LPG and BTX.

The composition of naphtha commonly is very different from the composition of refinery unit-derived light-distillate, especially in terms of the aromatics content. By feeding the naphtha to a first hydrocracker ("feed hydrocracker"), and at least a portion of the refinery unit-derived light-distillate, preferably the aromatics-rich refinery unit-derived light-distillate, to a second hydrocracker ("gasoline hydrocracker"), the process conditions and catalyst can be specifically adapted to the feed, resulting in an improved yield and purity of the LPG and/or BTX produced by said hydrocrackers. In addition thereto, the process can be more easily adapted, e.g. by adjusting the process temperature used in one or both hydrocrackers, to either produce more LPG that are converted to olefins or to produce more BTX, thereby allowing fine-tuning of the overall hydrogen balance of the integrated process of the invention. By balancing ratio of olefins produced and aromatics produced a neutral hydrogen balance can be obtained in the integrated process of the present invention, depending on hydrogen balance of the feed. With hydrogen-rich feeds, such as shale oil, (almost) no aromatics have to be produced to obtain hydrogen balanced overall process.

As used herein, the term "gasoline hydrocracking unit" or "GHC" refers to a refinery unit for performing a hydrocracking process suitable for converting a complex hydrocarbon feed that is relatively rich in aromatic hydrocarbon compounds—such as refinery unit-derived light-distillate including, but not limited to, reformer gasoline, FCC gasoline and pyrolysis gasoline (pygas)—to LPG and BTX, wherein said process is optimized to keep one aromatic ring intact of the aromatics comprised in the GHC feedstream, but to remove most of the side-chains from said aromatic ring. Accordingly, the main product produced by gasoline hydrocracking is BTX and the process can be optimized to provide chemicals-grade BTX. Preferably, the hydrocarbon feed that is subject to gasoline hydrocracking comprises refinery unit-derived light-distillate. More preferably, the hydrocarbon feed that is subjected to gasoline hydrocracking preferably does not comprise more than 1 wt-% of hydrocarbons having more than one aromatic ring. Preferably, the gasoline hydrocracking conditions include a temperature of 300-580° C., more preferably of 450-580° C. and even more preferably of 470-550° C. Lower temperatures must be avoided since hydrogenation of the aromatic ring becomes favourable. However, in case the catalyst comprises a further element that reduces the hydrogenation activity of the catalyst, such as tin, lead or bismuth, lower temperatures may be selected for gasoline hydrocracking; see e.g. WO 02/44306 A1 and WO 2007/055488. In case the reaction temperature is too high, the yield of LPG's (especially propane and butanes) declines and the yield of methane rises. As the catalyst activity may decline over the lifetime of the catalyst, it is advantageous to increase the reactor temperature gradually over the life time of the catalyst to maintain the hydrocracking conversion rate. This means that the optimum temperature at the start of an operating cycle preferably is at the lower end of the hydrocracking temperature range. The optimum reactor temperature will rise as the catalyst deactivates so that at the end of a cycle (shortly before the catalyst is replaced or regenerated) the temperature preferably is selected at the higher end of the hydrocracking temperature range.

Preferably, the gasoline hydrocracking of a hydrocarbon feedstream is performed at a pressure of 0.3-5 MPa gauge, more preferably at a pressure of 0.6-3 MPa gauge, particularly preferably at a pressure of 1-2 MPa gauge and most preferably at a pressure of 1.2-1.6 MPa gauge. By increasing reactor pressure, conversion of C5+ non-aromatics can be increased, but this also increases the yield of methane and the hydrogenation of aromatic rings to cyclohexane species which can be cracked to LPG species. This results in a reduction in aromatic yield as the pressure is increased and, as some cyclohexane and its isomer methylcyclopentane, are not fully hydrocracked, there is an optimum in the purity of the resultant benzene at a pressure of 1.2-1.6 MPa.

Preferably, gasoline hydrocracking of a hydrocarbon feedstream is performed at a Weight Hourly Space Velocity (WHSV) of 0.1-10 $h^{-1}$, more preferably at a Weight Hourly Space Velocity of 0.2-6 $h^{-1}$ and most preferably at a Weight Hourly Space Velocity of 0.4-2 $h^{-1}$. When the space velocity is too high, not all BTX co-boiling paraffin components are hydrocracked, so it will not be possible to achieve BTX specification by simple distillation of the reactor product. At too low space velocity the yield of methane rises at the expense of propane and butane. By selecting the optimal Weight Hourly Space Velocity, it was surprisingly found that sufficiently complete reaction of the benzene co-boilers is achieved to produce on spec BTX without the need for a liquid recycle.

Accordingly, preferred gasoline hydrocracking conditions thus include a temperature of 450-580° C., a pressure of 0.3-5 MPa gauge and a Weight Hourly Space Velocity of 0.1-10 $h^{-1}$. More preferred gasoline hydrocracking conditions include a temperature of 470-550° C., a pressure of 0.6-3 MPa gauge and a Weight Hourly Space Velocity of 0.2-6 $h^{-1}$. Particularly preferred gasoline hydrocracking conditions include a temperature of 470-550° C., a pressure of 1-2 MPa gauge and a Weight Hourly Space Velocity of 0.4-2 $h^{-1}$.

As used herein, the term "feed hydrocracking unit" or "FHC" refers to a refinery unit for performing a hydrocracking process suitable for converting a complex hydrocarbon feed that is relatively rich in naphthenic and paraffinic hydrocarbon compounds—such as straight run cuts including, but not limited to, naphtha—to LPG and alkanes. Preferably, the hydrocarbon feed that is subject to feed hydrocracking comprises naphtha and/or the light-distillate produced by aromatic ring opening. Accordingly, the main product produced by feed hydrocracking is LPG that is to be converted into olefins (i.e. to be used as a feed for the conversion of alkanes to olefins). The FHC process may be optimized to keep one aromatic ring intact of the aromatics comprised in the FHC feedstream, but to remove most of the side-chains from said aromatic ring. In such a case, the process conditions to be employed for FHC are comparable to the process conditions to be used in the GHC process as described herein above. Preferably, the FHC process conditions comprise a lower process temperature than the GHC process to reduce the methane make. Accordingly, the FHC process conditions comprise a temperature of 300-450° C., a pressure of 300-5000 kPa gauge and a Weight Hourly Space Velocity of 0.1-10 $h^{-1}$. Even more preferred FHC conditions optimized to the ring-opening of aromatic hydrocarbons include a temperature of 300-400° C., a pressure of 600-3000 kPa gauge and a Weight Hourly Space Velocity of 0.2-2 $h^{-1}$. Alternatively, the FHC process can be optimized to open the aromatic ring of the aromatic hydrocarbons comprised in the FHC feedstream. This can be achieved by modifying the GHC process as described herein by increasing the hydrogenation activity of the catalyst, optionally in combination with selecting a lower process temperature, optionally in combination with a reduced space velocity. In such a case, preferred feed hydrocracking conditions thus include a temperature of 300-550° C., a pressure of 300-5000 kPa gauge and a Weight Hourly Space Velocity of 0.1-10 h-1. More preferred feed hydrocracking conditions include a temperature of 300-450° C., a pressure of 300-5000 kPa gauge and a Weight Hourly Space Velocity of 0.1-10 $h^{-1}$. Even more preferred FHC conditions optimized to the ring-opening of aromatic hydrocarbons include a temperature of 300-400° C., a pressure of 600-3000 kPa gauge and a Weight Hourly Space Velocity of 0.2-2 $h^{-1}$. Preferably, the light-distillate produced by FHC, which is relatively rich in aromatic hydrocarbons, is subsequently subjected to GHC to ensure that all co-boilers of BTX are converted so that on-spec benzene can be produced by simple distillation without the need of extraction.

The process of the present invention may require removal of sulfur from certain crude oil fractions to prevent catalyst deactivation in downstream refinery processes, such as catalytic reforming or fluid catalytic cracking. Such a hydrodesulfurization process is performed in a "HDS unit" or "hydrotreater"; see Alfke (2007) loc. cit. Generally, the hydrodesulfurization reaction takes place in a fixed-bed reactor at elevated temperatures of 200-425° C., preferably of 300-400° C. and elevated pressures of 1-20 MPa gauge, preferably 1-13 MPa gauge in the presence of a catalyst comprising elements selected from the group consisting of Ni, Mo, Co, W and Pt, with or without promoters, supported on alumina, wherein the catalyst is in a sulfide form.

The process of the present invention may further comprise hydrodealkylation of BTX to produce benzene. In such a hydrodealkylation process, BTX (or only the toluene and xylenes fraction of said BTX produced) is contacted with hydrogen under conditions suitable to produce a hydrodealkylation product stream comprising benzene and fuel gas mainly consisting of methane.

The process step for producing benzene from BTX may include a step wherein the benzene comprised in the hydrocracking product stream is separated from the toluene and xylenes before hydrodealkylation. The advantage of this separation step is that the capacity of the hydrodealkylation reactor is increased. The benzene can be separated from the BTX stream by conventional distillation.

Processes for hydrodealkylation of hydrocarbon mixtures comprising C6-C9 aromatic hydrocarbons are well known in the art and include thermal hydrodealkylation and catalytic hydrodealkylation; see e.g. WO 2010/102712 A2. Catalytic hydrodealkylation is preferred in the context of the present invention as this hydrodealkylation process generally has a higher selectivity towards benzene than thermal hydrodealkylation. Preferably catalytic hydrodealkylation is employed, wherein the hydrodealkylation catalyst is selected from the group consisting of supported chromium oxide catalyst, supported molybdenum oxide catalyst, platinum on silica or alumina and platinum oxide on silica or alumina.

The process conditions useful for hydrodealkylation, also described herein as "hydrodealkylation conditions", can be easily determined by the person skilled in the art. The process conditions used for thermal hydrodealkylation are for instance described in DE 1668719 A1 and include a temperature of 600-800° C., a pressure of 3-10 MPa gauge and a reaction time of 15-45 seconds. The process conditions used for the preferred catalytic hydrodealkylation are described in WO 2010/102712 A2 and preferably include a temperature of 500-650° C., a pressure of 3.5-8 MPa gauge, preferably of 3.5-7 MPa gauge and a Weight Hourly Space Velocity of 0.5-2 $h^{-1}$. The hydrodealkylation product stream is typically separated into a liquid stream (containing benzene and other aromatics species) and a gas stream (containing hydrogen, $H_2S$, methane and other low boiling point hydrocarbons) by a combination of cooling and distillation. The liquid stream may be further separated, by distillation, into a benzene stream, a C7 to C9 aromatics stream and optionally a middle-distillate stream that is relatively rich in aromatics. The C7 to C9 aromatic stream may be fed back to reactor section as a recycle to increase overall conversion and benzene yield. The aromatic stream which contains polyaromatic species such as biphenyl, is preferably not recycled to the reactor but may be exported as a separate product stream and recycled to the integrated process as middle-distillate ("middle-distillate produced by hydrodealkylation"). The gas stream contains significant quantities of hydrogen may be recycled back the hydrodealkylation unit via a recycle gas compressor or to any other refinery unit comprised in the process of the present invention that uses hydrogen as a feed. A recycle gas purge may be used to control the concentrations of methane and $H_2S$ in the reactor feed.

In a further aspect, the present invention also relates to a process installation suitable for performing the process of the invention. This process installation and the process as performed in said process installation is presented in FIGS. 1-4 (FIG. 1-4).

Accordingly, the present invention provides a process installation to convert crude oil into petrochemical products comprising a crude distillation unit (10) comprising an inlet for crude oil (100) and at least one outlet for one or more of naphtha, kerosene and gasoil (310);

a hydrocracker (20) comprising an inlet for a hydrocracker feed (301), an outlet for LPG (210) and an outlet for BTX (600); and a unit for olefins synthesis (30) comprising an inlet for LPG produced by the integrated petrochemical process installation (200) and an outlet for olefins (500), wherein said hydrocracker feed comprises:

one or more of naphtha, kerosene and gasoil produced by the crude oil distillation unit (10); and refinery unit-derived light-distillate and/or refinery unit-derived middle-distillate produced the integrated petrochemical process installation.

This aspect of the present invention is presented in FIG. 1 (FIG. 1).

As used herein, the term "an inlet for X" or "an outlet of X", wherein "X" is a given hydrocarbon fraction or the like relates to an inlet or outlet for a stream comprising said hydrocarbon fraction or the like. In case of an outlet for X is directly connected to a downstream refinery unit comprising an inlet for X, said direct connection may comprise further units such as heat exchangers, separation and/or purification units to remove undesired compounds comprised in said stream and the like.

If, in the context of the present invention, a refinery unit is fed with more than one feed stream, said feedstreams may be combined to form one single inlet into the refinery unit or may form separate inlets to the refinery unit.

The crude distillation unit (10) preferably further comprises an outlet for gases fraction (230). The LPG produced by hydrocracking (210) and LPG comprised in the gases fraction obtained by crude oil distillation and refinery unit-derived LPG produced in the integrated process (220) may be combined to form the inlet for LPG produced by the integrated petrochemical process installation (200). Furthermore, one or more of naphtha, kerosene and gasoil produced by the crude oil distillation unit (310) may be combined with refinery unit-derived light-distillate and/or refinery unit-derived middle-distillate produced in the integrated petrochemical process installation (320) to form the inlet for a hydrocracker feed (301).

Figure 2:
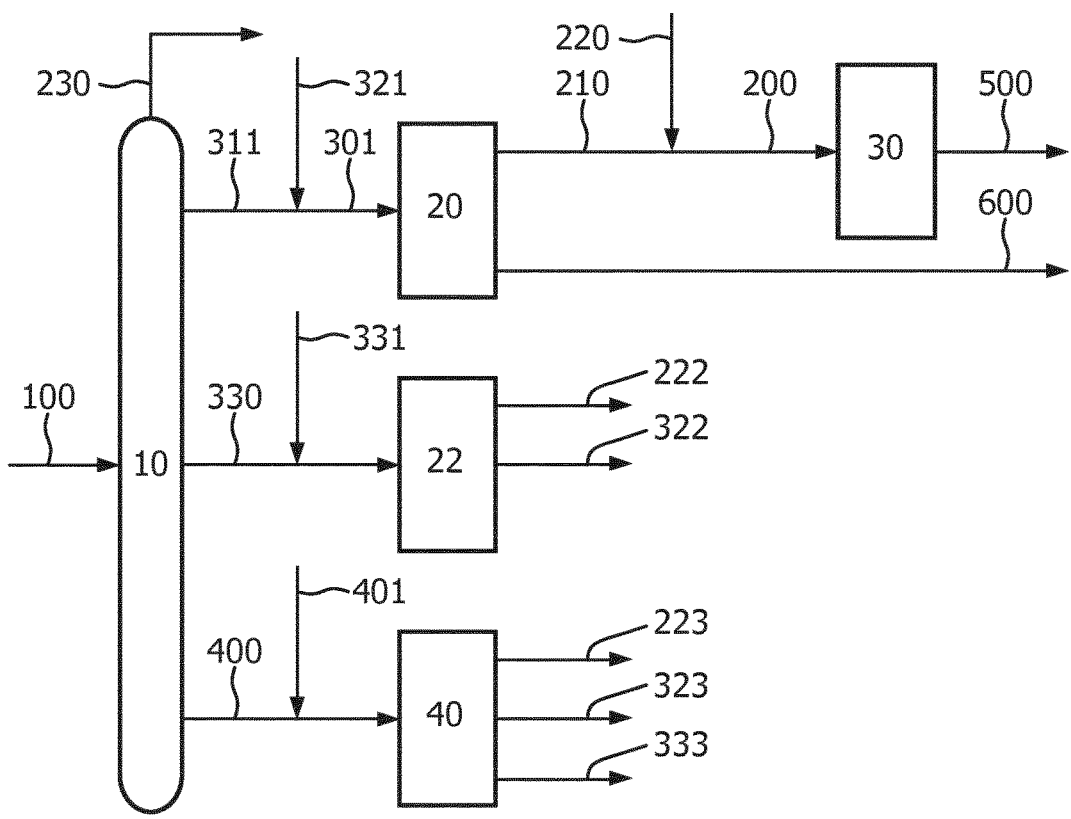
FIG. 2 depicts an embodiment of a process installation according to the present invention.

Preferably, the process installation of the present invention comprises:

an aromatic ring opening unit (22) comprising an inlet for one or more selected from the group consisting of kerosene and gasoil (330) and refinery unit-derived middle-distillate (331) and an outlet for LPG produced by aromatic ring opening (222) and an outlet for light-distillate produced by aromatic ring opening (322). This aspect of the present invention is presented in FIG. 2 (FIG. 2).

In this embodiment, hydrocracker (20) preferably comprises an inlet for a hydrocracker feed comprising naphtha produced by the crude oil distillation unit (311), which preferably is combined with refinery unit-derived light-distillate produced the integrated petrochemical process installation (321).

Figure 4:
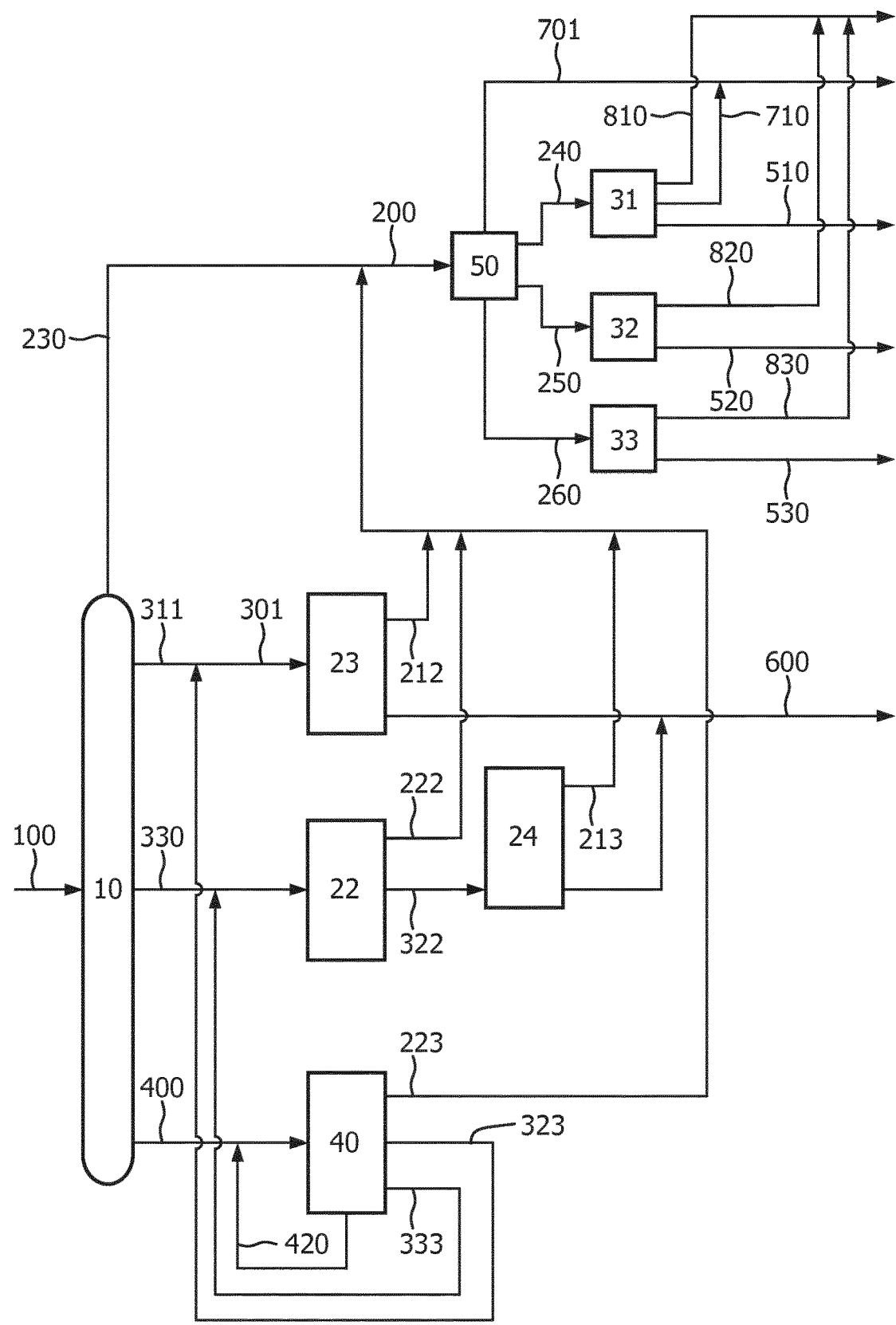
FIG. 4 depicts an embodiment of a process installation according to the present invention.

Furthermore, the crude distillation unit (10) may comprise one or more outlets for gases fraction (230), naphtha (311), one or more of kerosene and gasoil (330), and resid (400); see FIG. 4.

The process installation of the present invention may further comprise a resid upgrading unit (40) comprising an inlet for resid (400) and refinery unit-derived heavy-distillate (401) and an outlet for LPG produced by resid upgrading (223), an outlet for light-distillate produced by resid upgrading (323) and an outlet for middle-distillate produced by resid upgrading (333). The resid upgrading unit (40) may further comprise an outlet for heavy-distillate produced by resid upgrading (420) which may be recycled to the resid upgrading unit (40) to further upgrade said heavy-distillate.

Figure 3:
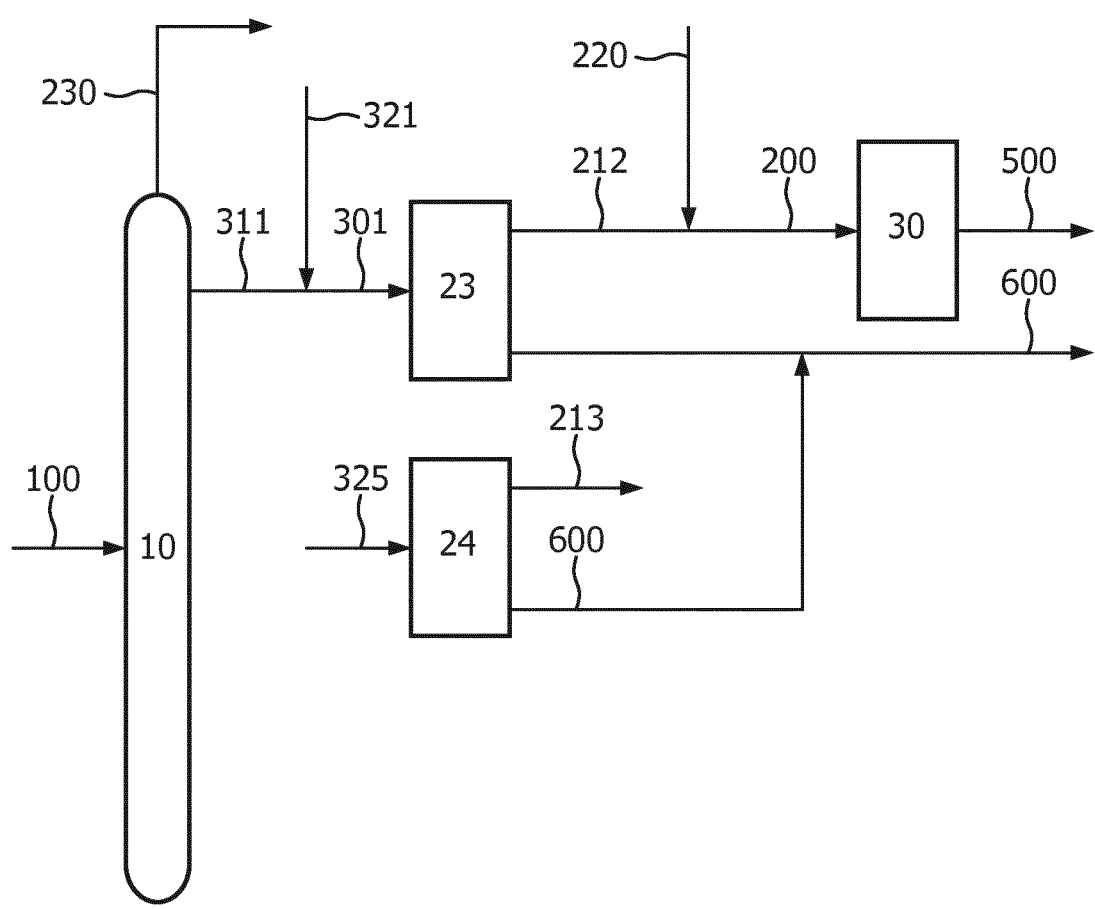
FIG. 3 depicts an embodiment of a process installation according to the present invention.

Preferably, the process installation of the present invention comprises at least two distinct hydrocrackers, wherein the first hydrocracker (23) ("feed hydrocracker") comprising an inlet for naphtha (311) and an outlet for LPG produced by feed hydrocracking (212) and an outlet for BTX (600); and the second hydrocracker (24) ("gasoline hydrocracker") comprising an inlet for at least a portion of the refinery unit-derived light-distillate (325) and an outlet for LPG produced by gasoline hydrocracking (213) and an outlet for BTX (600). This aspect of the present invention is presented in FIG. 3 (FIG. 3).

Feed hydrocracker (23) preferably comprises an inlet for a hydrocracker feed comprising naphtha produced by the crude oil distillation unit (311), which may be combined with refinery unit-derived light-distillate produced the integrated petrochemical process installation (321), preferably refinery unit-derived light-distillate having a relatively low aromatics content.

Preferably, the process installation of the present invention further comprises:

a gas separation unit (50) comprising an inlet for gases produced in the integrated process (200), an outlet for ethane (240) and an outlet for propane (250);

an ethane cracker (31) comprising an inlet for ethane (240) and an outlet for ethylene (510); and a propane dehydrogenation unit (32) comprising an inlet for propane (250) and an outlet for propylene (520). This aspect of the present invention is presented in FIG. 4 (FIG. 4).

The gas separation unit (50) may further comprise an outlet for methane (701). The ethane cracker (31) may further comprise an outlet for hydrogen produced by ethane cracking (810) and an outlet for methane produced by ethane cracking (710). The propane dehydrogenation unit (32) may further comprise an outlet for hydrogen produced by propane dehydrogenation (820).

The gas separation unit (50) may further comprise an outlet for butane (260), wherein said process installation further comprises a butane dehydrogenation unit (33) comprising an inlet for butane (260) and an outlet for butylenes (530). The butane dehydrogenation unit (33) may further comprise an outlet for hydrogen produced by butane dehydrogenation (830).

The present invention further provides the use of the process installation according to the present invention for converting crude oil into petrochemical products comprising olefins and BTX.

A further preferred feature of the present invention is that all non-desired products, such as non-high-value petrochemicals may be recycled to the appropriate unit to convert such a non-desired product to either a desired product (e.g. a high-value petrochemical) or to a product that is a suitable as feed to a different unit. This aspect of the present invention is presented in FIG. 4 (FIG. 4). Accordingly, light-distillate produced by resid upgrading (323), which has a relatively low aromatics content, may be recycled to hydrocracking, preferably feed hydrocracking. Furthermore, the middle-distillate produced by resid upgrading (333) may be recycled to hydrocracking, preferably to aromatic ring opening.

In the process and the process installation of the present invention, all methane produced is collected and preferably subjected to a separation process to provide fuel gas. Said fuel gas is preferably used to provide the process heat in the form of hot flue gases produced by burning the fuel gas or by forming steam. Alternatively, the methane can be subjected to steam reforming to produce hydrogen. Also the undesired side products produce by e.g. steam cracking may be recycled. For instance, the carbon black oil and cracked distillate produced by steam cracking may be recycled to aromatic ring opening.

The different units operated in the process or the process installation of the present invention are furthermore integrated by feeding the hydrogen produced in certain processes, such as in olefins synthesis, as a feedstream to processes that need hydrogen as a feed, such as in hydrocracking. In case the process and the process installation is a net consumer of hydrogen (i.e. during start-up of the process or the process installation or because all hydrogen consuming processes consume more hydrogen than produced by all hydrogen producing processes), reforming of additional methane or fuel gas than the fuel gas produced by the process or the process installation of the present invention may be required.

The following numerical references are used in FIGS. 1-4:
10 crude distillation unit
20 hydrocracker unit
22 aromatic ring opening unit
23 feed hydrocracker
24 gasoline hydrocracker
30 unit for olefins synthesis
31 ethane cracker
32 propane dehydrogenation unit
33 butane dehydrogenation unit
40 resid upgrading unit, preferably a resid hydrocracker
50 gas separation unit
100 crude oil
200 LPG produced in the integrated process
210 LPG from hydrocracker
212 LPG from feed hydrocracker
213 LPG from gasoline hydrocracker
220 gases fraction obtained by crude oil distillation and refinery unit-derived LPG produced in the integrated process
222 LPG produced by aromatic ring opening
223 LPG produced by resid upgrading
230 gases fraction by crude oil distillation
240 ethane
250 propane
260 butanes
301 hydrocracker feed
310 one or more of naphtha, kerosene and gasoil produced by crude oil distillation
311 naphtha produced by crude oil distillation
320 refinery unit-derived light-distillate and/or refinery unit-derived middle-distillate produced in the integrated process
321 refinery unit-derived light-distillate produced in the integrated process
322 light-distillate produced by aromatic ring opening
323 light-distillate produced by resid upgrading
325 at least a portion of the refinery unit-derived light-distillate
330 one or more selected from the group consisting of kerosene and gasoil produced by crude oil distillation
331 refinery unit-derived middle-distillate
333 middle-distillate produced by resid upgrading
400 resid
401 refinery unit-derived heavy-distillate
420 heavy-distillate produced by resid upgrading
500 olefins
510 ethylene produced by ethane cracking
520 propylene produced by propane dehydrogenation
530 C4 olefins produced by butane dehydrogenation
600 BTX
610 BTX produced by aromatization
701 methane produced by gas separation
710 methane produced by ethane cracking
810 hydrogen produced by ethane cracking
820 hydrogen produced by propane dehydrogenation
830 hydrogen produced by butane dehydrogenation Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims.

It is noted that the term "comprising" does not exclude the presence of other elements. However, it is also to be understood that a description on a product comprising certain components also discloses a product consisting of these components. Similarly, it is also to be understood that a description on a process comprising certain steps also discloses a process consisting of these steps.

The present invention will now be more fully described by the following non-limiting Examples.

COMPARATIVE EXAMPLE 1

The experimental data as provided herein were obtained by flowsheet modelling in Aspen Plus. The steam cracking kinetics were taken into account rigorously (software for steam cracker product slate calculations). The following steam cracker furnace conditions were applied: ethane and propane furnaces: coil outlet temperature (COT)=845° C. and steam-to-oil-ratio=0.37, C4-furnaces and liquid furnaces: COT=820° C. and Steam-to-oil-ratio=0.37. For the feed hydrocracking, a reaction scheme has been used that is based on experimental data. For the aromatic ring opening followed by gasoline hydrocracking a reaction scheme has been used in which all multi aromatic compounds were converted into BTX and LPG and all naphthenic and paraffinic compounds were converted to LPG. The product slates from propane dehydrogenation and butane dehydrogenation were based on literature data. The resid hydrocracker was modelled based on data from literature.

In Comparative Example 1, Arabian light crude oil is distilled in an atmospheric distillation unit. All fractions except the resid are being steam cracked. The fractions sent to the steam cracker comprise LPG, naphtha, kerosene and gasoil fractions. The cut point for the resid is 350° C. The total fraction of the crude being sent to the steam cracker amounts to 50 wt % of the crude. In the steam cracker the above mentioned crude fractions are being cracked in the furnaces. The results are provided in table 1 as provided herein below.

The products that are derived from the crude oil are divided into petrochemicals (olefins and BTXE, which is an acronym for BTX+ ethylbenzene) and other products (hydrogen, methane and heavy fractions comprising C9 resin feed, cracked distillate, carbon black oil and resid). The total amount sums up to 100% of the total crude, since the resid is also taken into account. From the product slate of the crude oil the carbon efficiency is determined as:

(Total Carbon Weight in petrochemicals)/(Total Carbon Weight in Crude).

For the Comparative Example the carbon efficiency is 38.0 wt-%.

EXAMPLE 1

Example 1 is identical to the Comparative Example except for the following:

First, the naphtha fraction of the distillation is converted in a FHC unit to yield BTX (product) and LPG (intermediate). This LPG is separated into ethane-, propane- and butane fractions which are steam cracked.

Furthermore, the kerosene and gas oil fractions (cut point 350° C.) are subjected to aromatic ring opening that is operated under process conditions to maintain 1 aromatic ring. The effluent from the aromatic ring opening unit is further treated in a GHC unit to yield BTX (product) and LPG (intermediate). This LPG is separated into ethane-, propane- and butane fractions which are steam cracked.

Table 1 as provided herein below displays the total product slate from the steam cracker (cracked lights, naphtha and LPG) and from the FHC and GHC unit (BTX product) in wt % of the total crude. The table also contains the remaining atmospheric residue fraction.

For Example 1 the carbon efficiency is 42.3 wt-%.

EXAMPLE 2

Example 2 is identical to Example 1 except for the following:

First, the resid is upgraded in a resid hydrocracker to produce gases, light-distillate and middle-distillate. The gases produced by resid hydrocracking are being steam cracked. The light-distillate produced by resid hydrocracking is being fed to the FHC unit to yield BTX (product) and LPG (intermediate). This LPG is separated into ethane-, propane- and butane fractions which are steam cracked. The middle-distillate produced by resid hydrocracking are subjected to aromatic ring opening that is operated under process conditions to maintain 1 aromatic ring. The effluent from the aromatic ring opening is further treated in a GHC unit to yield BTX and LPG. This LPG is separated into ethane-, propane- and butane fractions which are steam cracked.

Furthermore, the heavy part of the cracker effluent (C9 resin feed, cracked distillate and carbon black oil) is being recycled to the resid hydrocracker. The ultimate conversion in the resid hydrocracker is close to completion (the pitch of the resid hydrocracker is 2 wt % of the crude).

Table 1 as provided herein below displays the total product slate of the crude oil from the steam cracker (cracked products of lights, naphtha and LPG) and from the FHC and GHC units (BTX product) in wt % of the total crude.

The product slate also contains the pitch of the hydrocracker (2 wt % of the crude). For Example 2 the carbon efficiency is 80.9 wt-%.

EXAMPLE 3

Example 3 is identical to Example 2 except for the following:

The propane and butane from the ARO-GHC units are not being steam cracked but being dehydrogenated into propylene and butene (with ultimate selectivities of propane to propylene 90%, and n-butane to n-butene of 90% and i-butane to i-butene of 90%).

Table 1 as provided herein below displays the total product slate from the steam cracker (cracked products of lights, naphtha and LPG) and from the FHC and the GHC unit (BTX product) in wt % of the total crude. The product slate also contains the pitch of the hydrocracker (2 wt % of the crude).

For example 3 the carbon efficiency is 93.5 w-%.

TABLE 1

| | Comparative Example | Example 1 | Example 2 | Example 3 |
|---|---|---|---|---|
| Petrochemicals (wt-% of crude) | | | | |
| Ethylene | 15% | 22% | 43% | 21% |
| Propylene | 8% | 6% | 11% | 41% |
| Butadiene | 2% | 1% | 2% | 0% |
| 1-butene | 1% | 0% | 1% | 8% |
| Isobutene | 1% | 0% | 1% | 2% |
| Isoprene | 0% | 0% | 0% | 0% |
| CPTD | 1% | 0% | 0% | 0% |
| Benzene | 4% | 3% | 5% | 4% |
| Toluene | 2% | 5% | 9% | 8% |
| Xylene | 1% | 3% | 5% | 5% |
| Ethylbenzene | 1% | 0% | 0% | 0% |
| Other components (wt-% of crude) | | | | |
| hydrogen | 1% | 1% | 2% | 4% |
| methane | 7% | 10% | 19% | 5% |
| Heavy components | 56% | 48% | 0% | 0% |
| Resid hydrocracker pitch | 0% | 0% | 2% | 2% |
| Carbon efficiency | 38.0% | 42.3% | 80.9% | 93.5% |

The invention claimed is:

1. An integrated process to convert crude oil into petrochemical products including olefins and BTX, the process comprising the steps of:
    distilling crude oil in a refinery unit to produce resid, naphtha, and at least one of kerosene and gasoil;
    upgrading the resid to produce a refinery unit derived light-distillate comprising hydrocarbons with one aromatic ring and having a boiling point range of 20-200° C. and a refinery unit derived middle-distillate comprising hydrocarbons with two aromatic rings and having a boiling point of 180-360° C.;
    combining the middle-distillate with at least the kerosene or the gasoil from crude distilling to provide a ring opening hydrocracker feed;
    subjecting the ring opening hydrocracker feed to ring opening hydrocracking to produce LPG comprising ethane, propane, or butane and additional light distillate comprising hydrocarbons with one aromatic ring and having a boiling point range of 20-200° C.;
    combining the light distillate from resid upgrading and/or light distillate from ring opening hydrocracking with naphtha from crude distilling to provide a hydrocracker feed;
    subjecting the hydrocracker feed to hydrocracking to produce additional LPG and BTX; and
    subjecting the LPG from ring opening hydrocracking and/or from hydrocracker feed hydrocracking to olefin synthesis through pyrolysis of ethane, dehydrogenation of propane, and/or dehydrogenation of butane.

2. The process according to claim 1, wherein the resid upgrading is resid hydrocracking.

3. The process according to claim 2, wherein at least 50 wt-% of the combined naphtha, kerosene and gasoil produced by the crude oil distillation in the process is subjected to hydrocracking.

4. The process according to claim 2, wherein the olefin synthesis comprises pyrolysis of ethane and dehydrogenation of propane.

5. The process according to claim 2, wherein the hydrocracker feed hydrocracking comprises subjecting naphtha to a first hydrocracking process to produce LPG and BTX and subjecting at least a portion of the refinery unit-derived light-distillate to a second hydrocracking process to produce LPG and BTX.

6. The process according to claim 1, wherein at least 50 wt-% of the combined naphtha, kerosene and gasoil produced by the crude oil distillation in the process is subjected to hydrocracking.

7. The process according to claim 1, wherein the olefins synthesis comprises pyrolysis of ethane and dehydrogenation of propane.

8. An integrated process to convert crude oil into petrochemical products including olefins and BTX, the process comprising the steps of:
   distilling crude oil in a refinery unit to produce a gases fraction, resid, naphtha and at least one of kerosene and gasoil;
   upgrading the resid to produce LPG and a refinery unit derived light-distillate comprising hydrocarbons with one aromatic ring and having a boiling point range of 20-200° C. and a refinery unit derived middle-distillate comprising hydrocarbons with two aromatic rings and having a boiling point of 180-360° C.;
   combining the middle-distillate with at least the kerosene or the gasoil from crude distilling to provide a ring opening hydrocracker feed;
   subjecting the ring opening hydrocracker feed to ring opening to produce liquefied petroleum gas (LPG) comprising ethane, propane or butane and additional light distillate comprising hydrocarbons with one aromatic ring and having a boiling point range of 20-200° C.;
   combining the light distillate from resid upgrading and/or light distillate from ring opening hydrocracking with naphtha from crude distilling to provide a hydrocracker feed;
   subjecting the hydrocracker feed to hydrocracking to produce additional LPG) and BTX;
   subjecting the LPG from ring opening hydrocracking and/or from hydrocracker feed hydrocracking to olefin synthesis through pyrolysis of ethane, dehydrogenation of propane, and/or dehydrogenation of
   wherein the olefin synthesis produces hydrogen.

9. The process according to claim 1, wherein the hydrocracker feed hydrocracking comprises subjecting naphtha to a first hydrocracking process to produce LPG and BTX and subjecting at least a portion of the refinery unit-derived light-distillate to a second hydrocracking process to produce LPG and BTX.

10. The process according to claim 1, wherein hydrogen produced from the integrated process is provided to at least one of the ring opening hydrocracking or to the hydrocracker feed hydrocracking and the olefins synthesis further comprises dehydrogenation of butane.

11. An integrated petrochemical process installation to perform the process of claim 8, the integrated petrochemical process installation comprising:
   a crude distillation unit comprising an inlet for crude oil and at least one outlet for naphtha, at least one outlet for at least one of kerosene and gasoil, and at least one outlet for gases, said naphtha, said kerosene, said gasoil, and said gases are produced by the crude distillation of crude oil in the crude distillation unit;
   a hydrocracker comprising an inlet for a hydrocracker feed, an outlet for LPG and an outlet for BTX, wherein the hydrocracker feed comprises a) at least one member selected from the group consisting of refinery derived light distillate and refinery derived middle distillate and b) the at least one or more of said naphtha, said gasoil, and said kerosene,
   wherein the hydrocracker further comprises an aromatic ring opening unit comprising an inlet for the ring opening hydrocracker feed and an outlet for LPG produced by aromatic ring opening and an outlet for light-distillate produced by aromatic ring opening;
   a unit for olefins synthesis comprising an inlet for the LPG produced by the aromatic ring opening and an outlet for olefins,
   a gas separation unit comprising an inlet for gases produced by the crude distillation unit said gas separation unit separates ethane and propane comprised in gases wherein the gas separation unit also comprises an outlet for the separated ethane and an outlet for the separated propane;
   an ethane cracker comprising an inlet for the separated ethane from the gas separation unit and an outlet for ethylene produced by the ethane cracker cracking the ethane; and
   a propane dehydrogenation unit comprising an inlet for the propane from the gas separation unit and an outlet for propylene produced in the propane dehydrogenation unit.

12. The process installation according to claim 11, wherein the crude distillation unit comprises one or more outlets for resid; and
   wherein said processes installation further comprises a resid upgrading unit comprising an inlet for resid and refinery unit-derived heavy-distillate and an outlet for LPG produced by resid upgrading, an outlet for light-distillate produced by resid upgrading and an outlet for middle-distillate produced by resid upgrading.

13. The process installation according to claim 11, wherein the hydrocracker comprises two distinct hydrocrackers, wherein the first hydrocracker comprises an inlet for naphtha and an outlet for LPG produced by the first hydrocracker and an outlet for BTX; and the second hydrocracker comprises an inlet for at least a portion of the refinery unit-derived light-distillate and an outlet for LPG produced by the second hydrocracker and an outlet for BTX.

14. The process installation according to claim 11, wherein the gas separation unit comprises an outlet for butane, and
   wherein said process installation further comprises a butane dehydrogenation unit comprising an inlet for butane and an outlet for butylenes.

15. The process according to claim 8, wherein hydrogen produced from the integrated process is provided to at least one of the ring opening hydrocracking or to the hydrocracker feed hydrocracking and the olefins synthesis further comprises dehydrogenation of butane.

* * * * *